Figure 1:
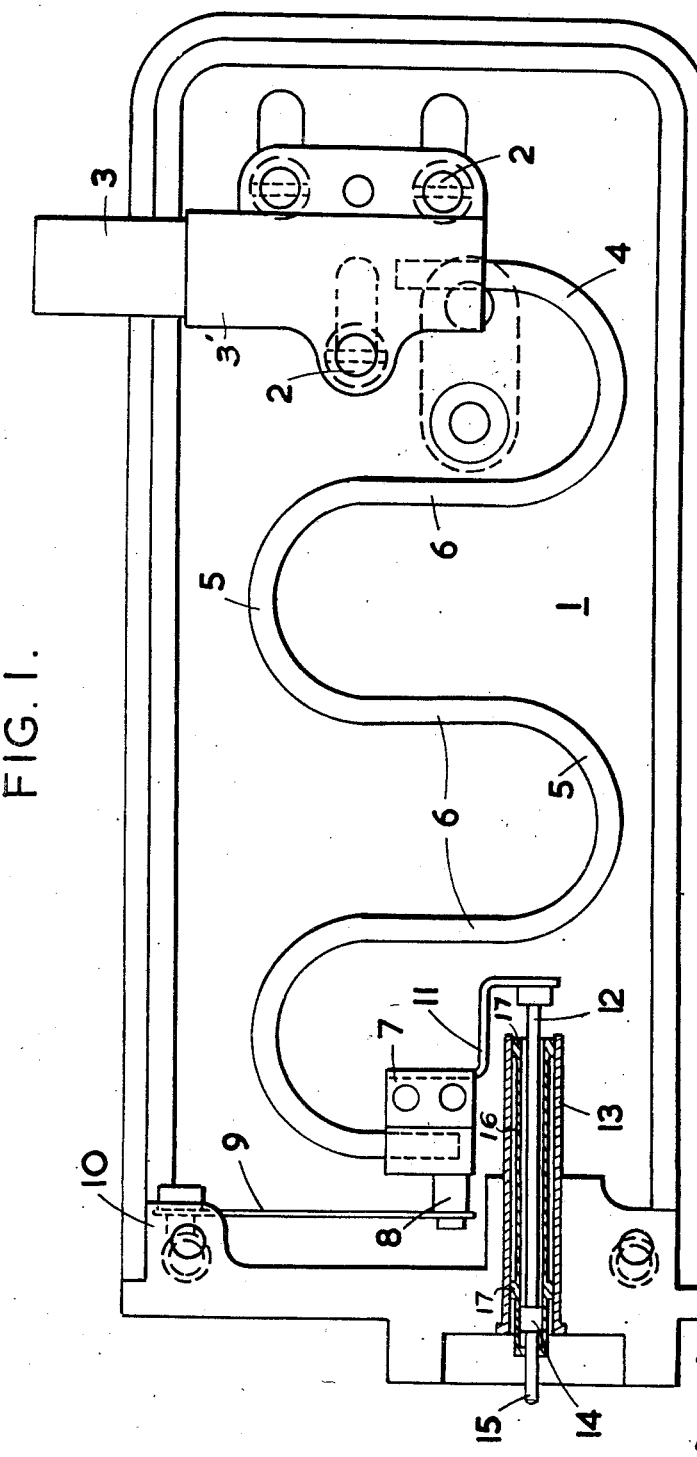

United States Patent Office 2,823,543
Patented Feb. 18, 1958

2,823,543
FLUID PRESSURE RESPONSIVE UNIT

Waldemar Emil Voss, London, England, assignor to L. Adams Limited, London, England, a company of Great Britain Application August 3, 1953, Serial No. 371,904

Claims priority, application Great Britain August 5, 1952

3 Claims. (Cl. 73—411)

This invention relates to a fluid pressure responsive unit, which is capable of transforming variation of fluid pressure therein to movement of a member in a straight line, in accordance with direct proportionality between the pressure applied and the movement produced, so that equal increments of pressure produce equal rectilinear movements of the member within a predetermined fixed distance, corresponding to the range of fluid pressure for which the unit is designed.

According to the present invention, a fluid pressure responsive unit comprises a tube adapted at one end for connection with a fluid pressure system, said tube being shaped in plan as a number of undulations in serpentine form consisting of alternate semi-circular portions of opposite curvature connected by straight parallel lengths or portions perpendicular to the axis of symmetry and perpendicular to the direction of motion when subjected internally to fluid pressure, the end of the tube remote from the pressure connection being closed, and having mounted thereon a pliant plunger, which, on admission of fluid pressure to the said tube, partakes of rectilinear movement of direct proportionality to variation in said fluid pressure, that is to say of movement according to a linear or rectilinear law.

Preferably also the tube has a cross-sectional form similar to that of the well known Bourdon tube.

Preferably, the closed end of the tube is anchored to an end piece, which is supported by spring means, such for example as a leaf spring, the other end of which is anchored to a fixed base or carrier to which the end of the tube fitted with the pressure connection is secured. The leaf spring is chosen to possess a spring rate which is small in relation to that of the pressure responsive tube and will therefore have minimum effect on the relationship between deflection of the tube and applied fluid pressure. The length of the leaf spring is chosen to be large in relation to the movement of its end secured to the end piece, which movement will, as later described, be seen to be arcuate, so that the deviation from rectilinearity in direction is slight and is accepted by the pliant plunger fitted to the tube. Flexure of the leaf spring, therefore, does not impose inacceptable constraint on movement of the closed end of the pressure responsive tube caused by variation in fluid pressure applied to the pressure connection, while the much greater stiffness of the leaf spring, in the plane of its breadth perpendicular to the deflections of the pressure responsive tube caused by pressure variations, serves to inhibit movements of the closed end of the said tube, due, for example, to applied vibration or acceleration in planes other than that in which movement, due to variation in applied fluid pressure, is required. The leaf spring, therefore assists the plunger in permitting one degree of freedom only to the closed end of the pressure responsive tube.

The plunger, at its end coupled to the tube or end piece anchored thereto, is preferably dimensioned so as to permit a certain amount of flexure, its outer or free end, which is supported in a friction bearing and which is capable only of rectilinear motion, being of increased thickness.

The undulating tube is preferably constructed of springy material having a relatively high elastic limit and high ratio of deformation to applied stress, for example beryllium copper alloy, Phosphor bronze or spring steel.

When used in conjunction with electrical transmission means as a pressure indication transmitter, for example in industrial process control in measuring a variable fluid pressure, it may be desirable to present, in addition to a remote indication at a control point, a local indication of the pressure applied at any instant at the point where the unit is installed. To provide for such an arrangement, the outer end of the plunger is linked to electrical transmission means, while the inner end is connected, via a known mechanism such as a toothed pivoted quadrant and pinion with associated hairspring forming a conventional pressure gauge movement to convert the rectilinear motion into arcuate motion, to a pointer movable over a graduated scale embodied in the same casing as the pressure responsive tube, thereby providing a visual indication of the magnitude of the applied pressure.

Alternatively or additionally, an identical mechanism can be used to produce arcuate motion of a pen or stylus arm over a printed chart, which is moved or translated beneath the arm by known means with respect to time, in order to produce a continuous chart record of the pressure variations.

If the total rectilinear displacement of the plunger over the required range of fluid pressure be made small in relation to the length of the tail of the toothed quadrant to which it is connected, the arcuate scale of pressure will be sensibly linear.

Figure 2:
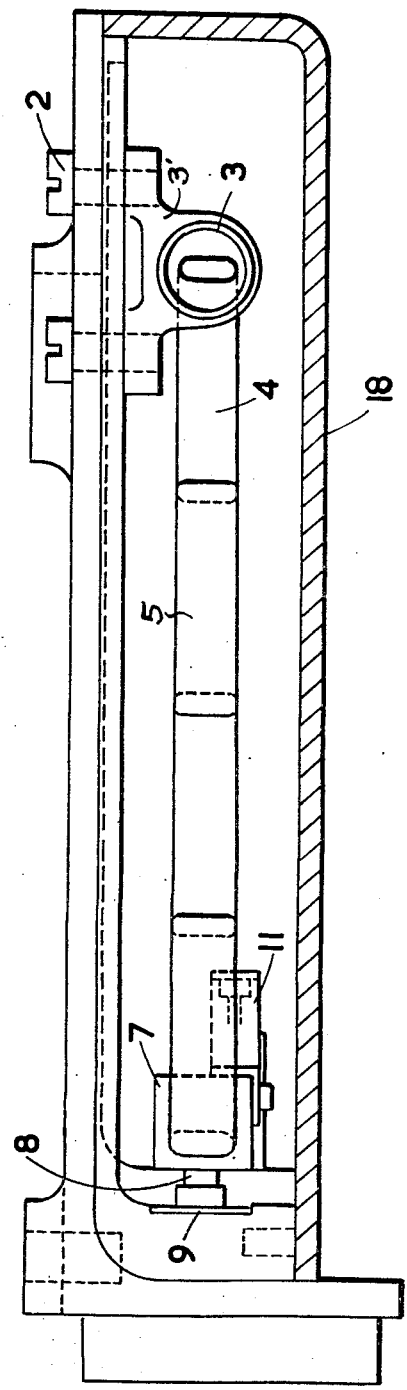
Figure 3:
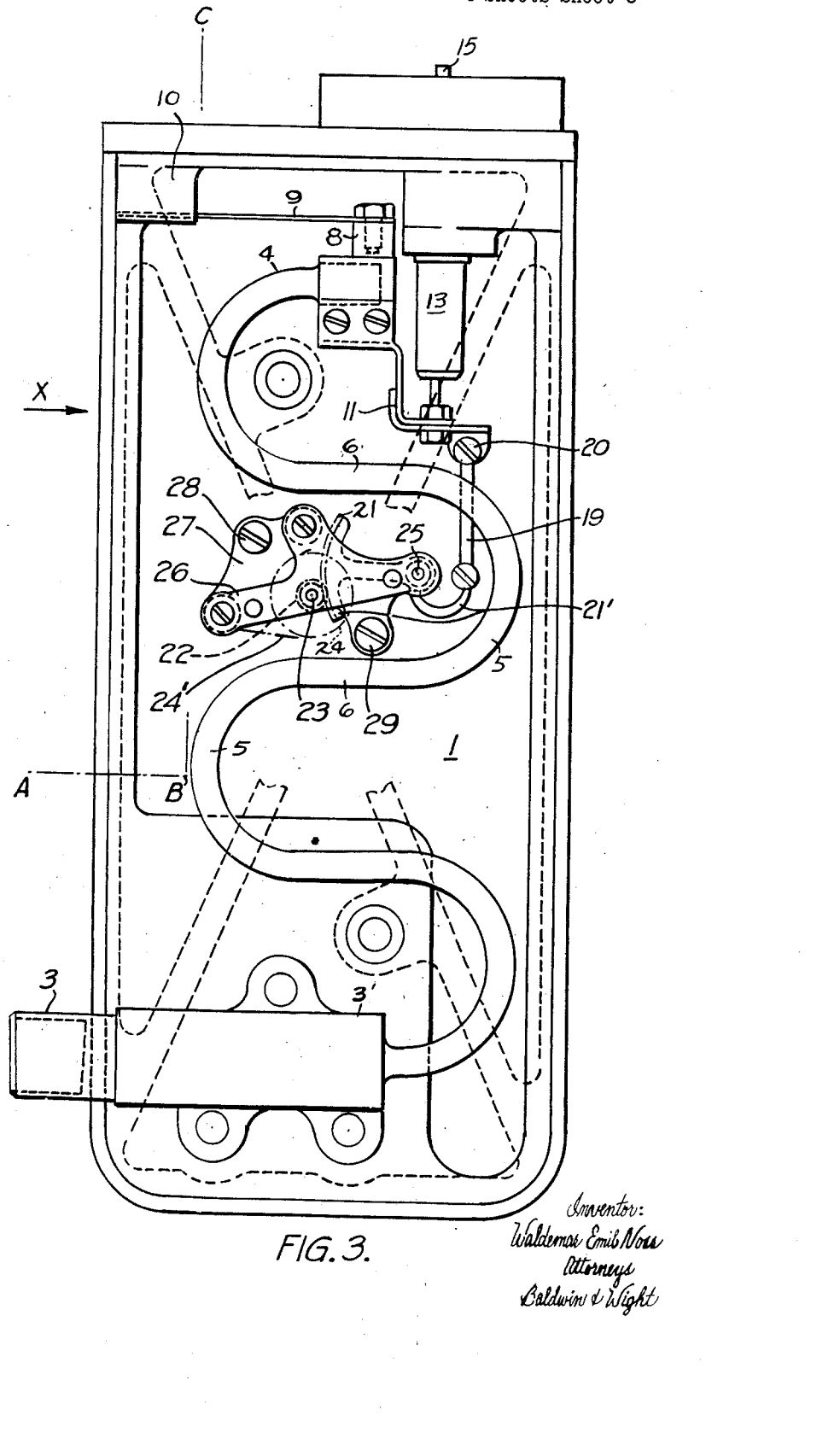
Figure 4:
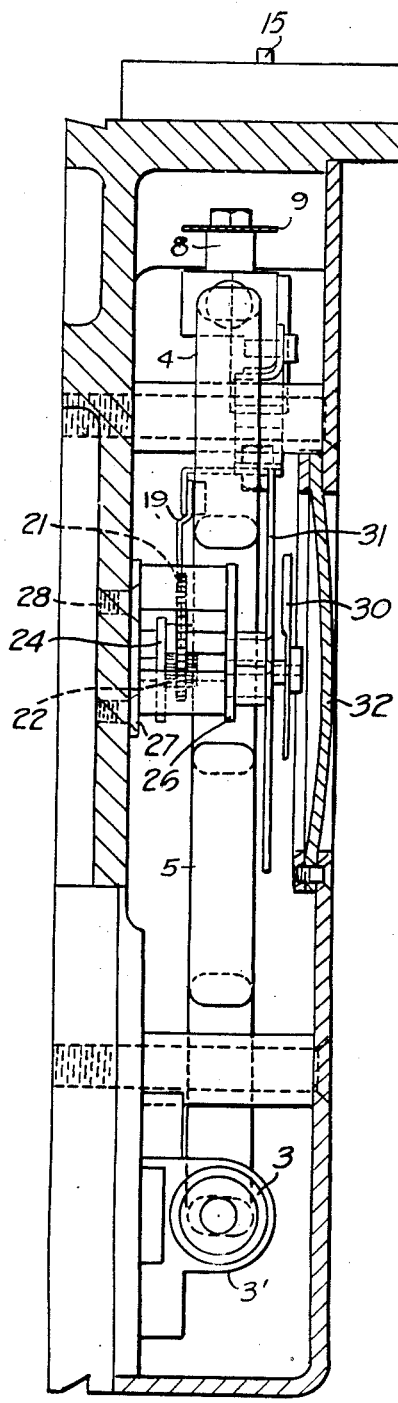

One form of the invention is diagrammatically illustrated in the accompanying drawings in which:

Figure 1 is a plan view of the unit mounted on a base or carrier with a cover removed, and Figure 2 is a side elevation view of the unit with the cover in place on the base, Figure 3 is a plan view of a unit incorporating an integral mechanically actuated indicator, housed in the same case as the pressure responsive unit; and Figure 4 is a part sectional view of the unit illustrated in Figure 3 on the line A. B. C. in the direction of the arrow X.

Referring to Figures 1 and 2, the unit comprises a ribbed base 1, preferably of die cast aluminium alloy, to which is secured by screws 2 a threaded union 3 for connecting to a fluid pressure system (not shown). The union 3 communicates permanently with a tube generally indicated at 4, which may be soft soldered into a connection block 3'. The tube 4 is shaped in the form of a number of semi-circular undulations 5 interconnected by straight lengths 6, the tube being closed at the end remote from the connection 3. The closed end of the tube 4 is connected, e. g. is soft soldered, to an end piece 7 flexibly carried, through a pin 8, by a leaf spring 9 secured at the other end to a lug 10 on the base 1.

The end piece 7 has secured thereto a cranked bracket 11 which carries a plunger 12. The plunger passes freely through a sleeve 13 to terminate in an enlarged portion 14 with a pin projection 15, the portion 14 having a tight fit in a piston 16, to fix it therein. The piston 16 has lands 17 providing a free sliding fit in the sleeve or cylinder 13, contact with the internal wall of the sleeve 13 being limited to the piston lands 17. The lands 17 maintain exact axial alinement of the piston 16 in the sleeve 13, while the tight fit of the enlargement 14 in the piston 16 fixes the enlargement 14 with respect to the piston 16. Since no transverse forces are applied to the projection 15 and the latter is fixed to the enlargement 14, it necessarily follows that the projection 15 moves in axial alinement with the piston 16. It will thus be appreciated that the inner end of the plunger 12 can flex within the internal clearance between it and the inner bore of the piston 16, while the outer end formed by the pin 15 moves only in a straight line, the pin 15 moving as a unit with the piston 16 by virtue of the tight fit of the enlarged portion 14 within the piston 16.

Referring to Figure 2, the base 1 is provided with a cover 18.

When fluid under pressure is admitted to the tube 4 via the connection 3, as in a Bourdon tube, the cross section of the tube 4 tends to become circular, thereby changing the curvature in the plane perpendicular to its cross section. The semi-circular portions 5 therefore tend to straighten and the sum of their extensions is conveyed through the bracket 11 to the plunger 12, and hence via the enlarged portion 14 to the piston 16, which slides outwardly in the sleeve 13, producing rectilinear movement of the pin end 15.

Reduction in fluid pressure causes the tube 4 to tend to reassume its original contour, thereby producing contraction and withdrawal of the pin 15, plunger 12 and the associated piston 16, until, if the applied pressure is reduced to zero, the parts resume their initial position. At all intermediate pressures up to the maximum pressure designed to produce the rated travel of the pin 15, movement of the pin 15 is directly proportional to the fluid pressure applied to the connection 3.

Since the total range of movement of the pin 15 is small in relation to the total length of the unit, the base 1 is required to be rigid and is preferably strengthened by reinforcing ribs in order to resist distortion by bending or torques applied at the pressure connection 3.

Referring to Figures 3 and 4, a pressure responsive unit, as hereinbefore described in relation to Figures 1 and 2, embodies additionally a pivoted link 19, which is secured by a pivot screw 20 to the bracket 11. The link 19 is pivoted to the curved tail 21' of a pivoted toothed quadrant 21, which is in mesh with the pinion 22, mounted on a pointer spindle 23, backlash between the quadrant 21 and pinion 22 being taken up by a spiral hairspring 24. This spring is shown in broken lines in Figure 3 and comprises a conventional coil 24, fixed at its inner end to the spindle 23 and having an anchored outer end 24'. A quadrant spindle 25 and the pointer spindle 23, work in plain bearings in top and bottom plates 26 and 27 respectively, the quadrant, pinion and plate assembly forming a conventional pressure gauge movement, which is secured to the base 1 of the pressure responsive unit by screws 28 and 29. The pointer spindle 23 carries a pointer 30.

Outward motion of the pin 15 caused by application of fluid pressure to the connection 3 is therefore also imparted to the link 19, which pulls the tail of the quadrant 21, thereby rotating the pinion 22 and pointer spindle 23 and hence the pointer 30. The position of the pointer 30 is read off on a graduated scale 31, the pointer and scale being protected by a transparent cover 32, which forms a window in the cover 18.

A pressure responsive unit as shown in Figures 3 and 4, therefore embodies an integral visual quantitative indication of the pressure applied to its connection, while the pin 15 is available for connection to electrical transmitting means to provide a remote indication of the same pressure as hereinbefore described.

It is a feature of the present invention that the effects of metallurgical hysteresis in the pressure responsive undulating tube are less than in comparable devices such as the conventional Bourdon tube, since the latter is normally of limited arcuate length less than 360 angular degrees, whereas the total deflection of the undulating tube, of this invention, is divided equally between a number of semi-circular portions and the tube is therefore less highly stressed than a conventional Bourdon tube producing the same deflection for the same pressure.

The anchorage of the root of the undulating tube into the pressure connection end piece is arranged to be perpendicular to the direction of rectilinear motion at the output end resulting from the application of fluid pressure and, due to this fact and because of the division of total deflection between the semi-circular curvatures, the strain on the joint of the root of the tube is lessened and is less than in a conventional Bourdon tube of arcuate form, where flexure occurs about the root of the tube. Both of these features described are conducive to a high degree of stability and reproducivity in the relationship between movement of the output plunger and the applied fluid pressure, and due to the formation of the tube and its anchorages, an accurate return to zero or original setting of the device is attained.

No gearing or adjustable linkage is required to obtain a predetermined rectilinear movement corresponding to a given applied pressure, the required characteristics being obtained from the properties of the undulating tube itself. In order to obtain the required output, the number and radius of curvature of the undulations can be varied and additionally or alternatively, the cross sectional shape and wall thickness of the tube may be varied in a manner which is known in itself to suit the required range and magnitude of the fluid pressure to be used.

It will be appreciated that since the output in the form of rectilinear motion proportional to applied fluid pressure can be standardised for units designed to work over the same range of pressure, such units are exactly interchangeable one with another, and any associated indicating instrument actuated thereby is unaffected by such interchange, while any scale of pressure marked on such associated indicating means may be made in quantity in accordance with a fixed law and can be used with any pressure responsive unit of a given nominal range without individual calibration.

The unit can usefully be employed to produce a quantitative indication of the fluid pressure applied to it at a distant point by electrical transmitting means which are known in themselves. Used as a pressure indication transmitter, the output plunger can, for example, be coupled to a metal wiper arm or brush which is thereby caused to move over a wire wound potentiometer, said potentiometer being connected to a direct current source of electrical supply and to a remote electrical measuring instrument scaled in terms of pressure.

If the electrical characteristics of the associated potentiometer and electrical indicator are linear, it will be appreciated that the resulting scale of pressure on the indicator will also be linear since the mechanical output from the pressure responsive unit is linearly proportional to the applied fluid pressure.

A unit according to this invention, when used in conjunction with known electrical transmitting means, can be employed, for example, to measure the fuel or hydraulic fluid pressure developed in aircraft engines and to provide a quantitative indication by means of an associated electrical indicator on an instrument panel.

The unit can also be employed to operate an electrical switch, an electro-mechanical limit switch or to actuate a mechanical or electrical signal required at a predetermined pressure.

I claim:

1. A fluid pressure responsive unit comprising a rigid base, a tube having a sealed output end and shaped in plan as a number of undulations in serpentine form, thus including alternate curved portions of opposite curvature connected by straight parallel portions spaced from each other perpendicular to the axis of symmetry and perpendicular to the direction of motion of said output end when subjected internally to fluid pressure, the other end of said tube being fixed to said base, a pressure connection for said other end of said tube, a leaf spring having one end fixed to said base and its other end fixed to said output end of said tube, the width of said spring being perpendicular to the direction of motion of said output end of the tube to prevent movement of said output end of the tube in directions other than the direction of movement due to the internal application of fluid pressure in the tube, a plunger, means guiding said plunger for linear movement generally in the direction of movement of said output end of said tube, said plunger having an axial extension of substantial length connected to said output end of said tube, said axial extension being pliant to accommodate components of movement of said output end of said tube transverse to said plunger.

2. A fluid pressure responsive unit comprising a tube lying in a plane and shaped to form undulations including alternate curved portions of opposite curvature and intermediate straight parallel portions spaced from each other, means anchoring one end of said tube, the other end of said tube being sealed, said tube having a connection for the supply of fluid pressure thereto, means supporting said other end of said tube for movement solely in said plane, a pliant plunger having one end mechanically connected to said other end of said tube, said plunger having an enlargement spaced a substantial distance from said one end of said plunger, a tubular piston in which said enlargement is fixed and the other end of said pliant plunger projecting beyond said enlargement, and means guiding said piston for linear movement.

3. A fluid pressure responsive unit as claimed in claim 2 wherein said means supporting said other end of said tube comprises a leaf spring having one end fixed and its other end connected to said tube, the width of said spring lying in a plane perpendicular to said first-named plane to restrain said other end of said tube against movement transverse to said first-named plane.

References Cited in the file of this patent

UNITED STATES PATENTS

| 17,988 | Wells | Aug. 11, 1857 |
| 2,050,629 | Quereau et al. | Aug. 11, 1936 |
| 2,084,623 | Pigott | June 22, 1937 |
| 2,294,869 | Buechmann | Sept. 1, 1942 |
| 2,670,989 | Ramsay | Mar. 2, 1954 |

FOREIGN PATENTS

| 12,889 | Great Britain | 1849 |